No. 834,384. PATENTED OCT. 30, 1906.
T. T. JOHNSTON.
PUMP.
APPLICATION FILED JUNE 28, 1905.

3 SHEETS—SHEET 1.

Witnesses:
E. E. Taylor.
John Enders.

Inventor:
Thomas Taylor Johnston
By Cheever & Cox
Attys.

No. 834,384. PATENTED OCT. 30, 1906.
T. T. JOHNSTON.
PUMP.
APPLICATION FILED JUNE 28, 1905.
3 SHEETS—SHEET 2.
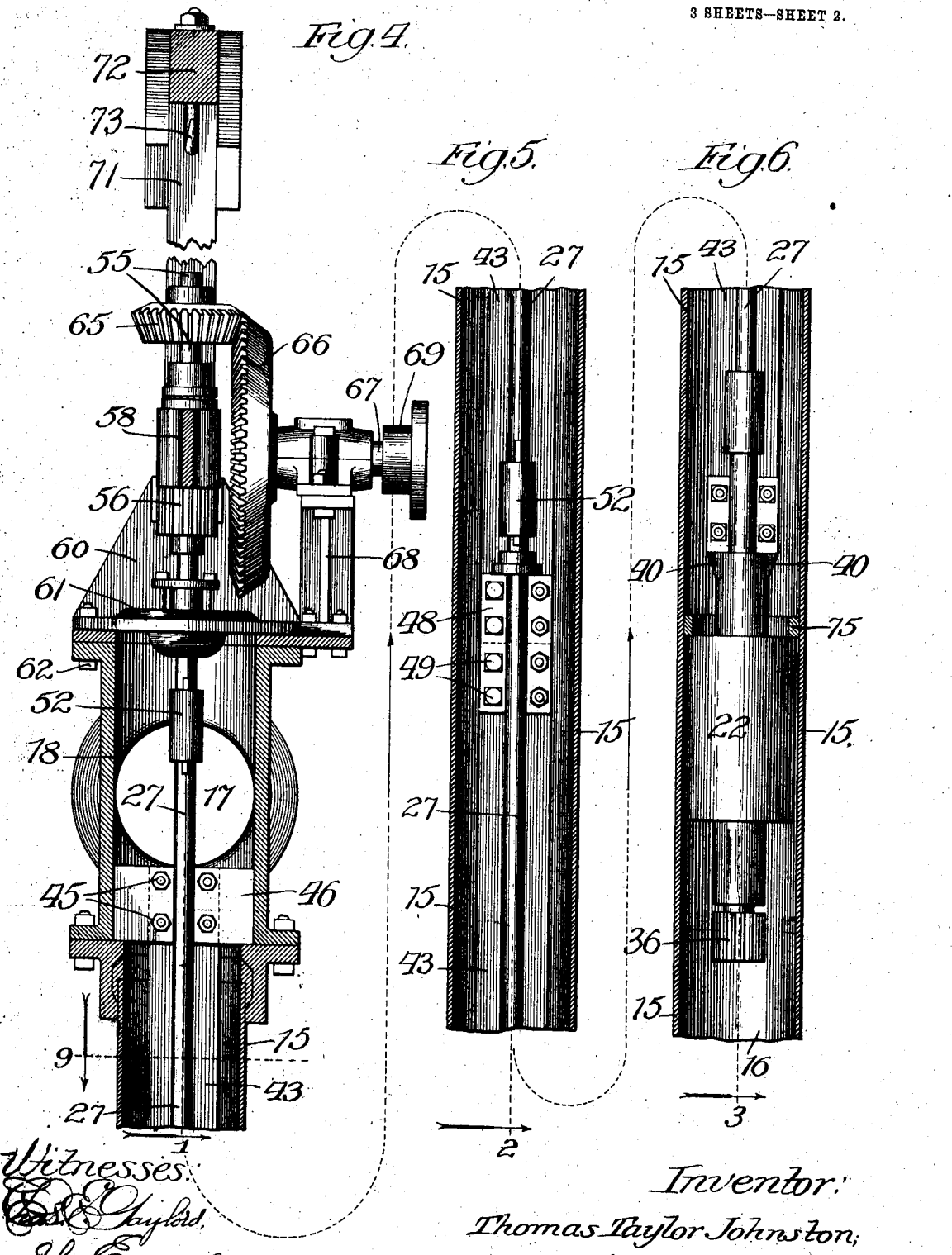
Inventor:
Thomas Taylor Johnston, No. 834,384. PATENTED OCT. 30, 1906.
T. T. JOHNSTON.
PUMP.
APPLICATION FILED JUNE 28, 1905.
3 SHEETS—SHEET 3.
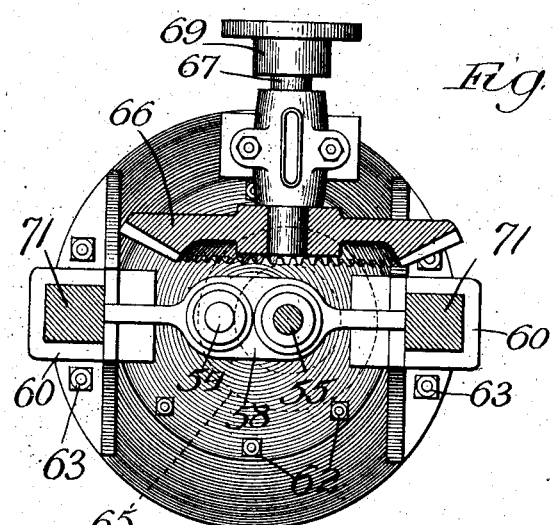
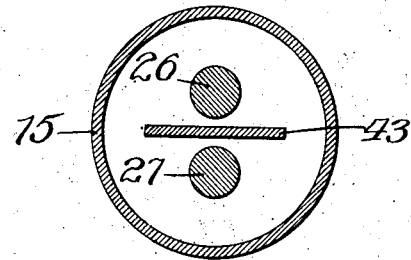
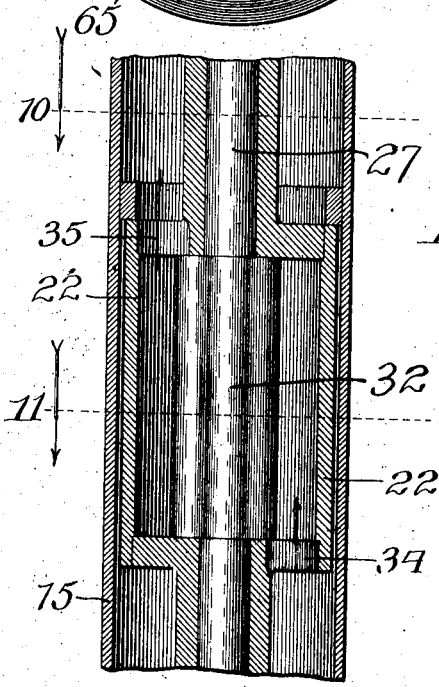
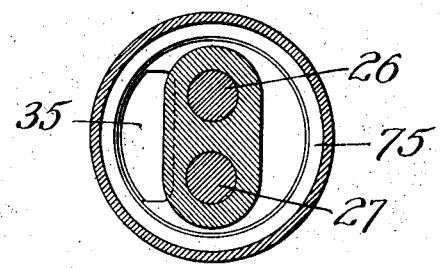
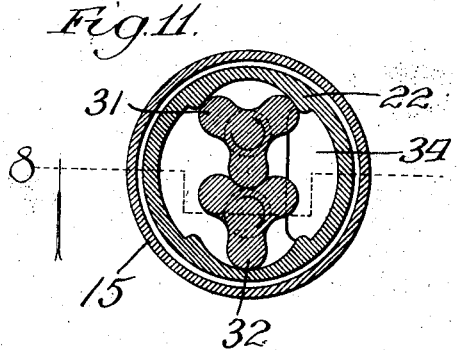
Witnesses:
Inventor:
Thomas Taylor Johnston,
By Cheever & Cox
Att'ys

UNITED STATES PATENT OFFICE.

THOMAS T. JOHNSTON, OF EVANSTON, ILLINOIS.

PUMP.

No. 834,384.　　　　　Specification of Letters Patent.　　　　Patented Oct. 30, 1906.

Application filed June 28, 1905. Serial No. 267,437.

*To all whom it may concern:*

Be it known that I, THOMAS T. JOHNSTON, a citizen of the United States, residing at Evanston, in the county of Cook and State of Illinois, have invented a certain new and useful Improvement in Pumps, of which the following is a specification.

My invention relates to pumps for pumping water from deep wells, and is particularly an improvement upon my United States Patent No. 744,352 for rotary pump, issued to me November 17, 1903.

The object of my invention is primarily to provide a cheap and economical means for hanging the pump of my said prior patent within a well, so that it can be removed therefrom without removing simultaneously the well-pipe.

A further object is to provide means for supplying power to the pump under these conditions and for supporting the driving rods or shafts for the pump in the well.

My invention consists in mechanism for accomplishing the above objects which can be easily and cheaply made and installed, which is efficient in operation, and not readily liable to get out of order.

It further consists in details of construction, which will be hereinafter more fully described and claimed as the specification proceeds.

Figure 1:
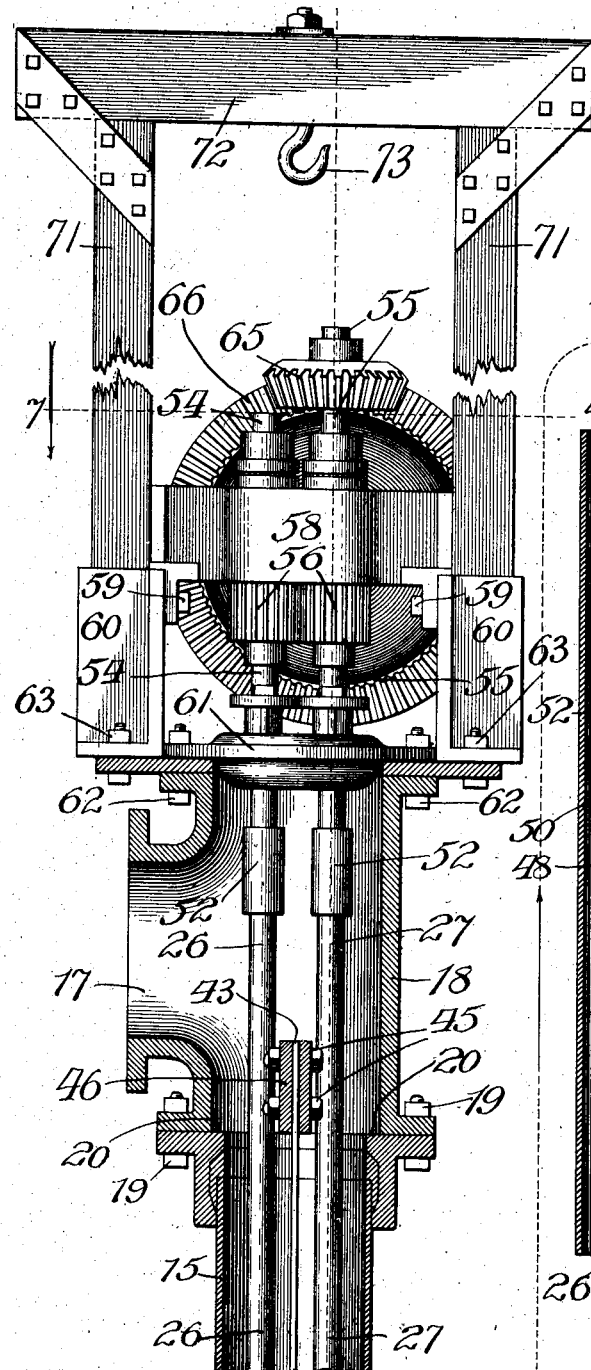
Figure 2:
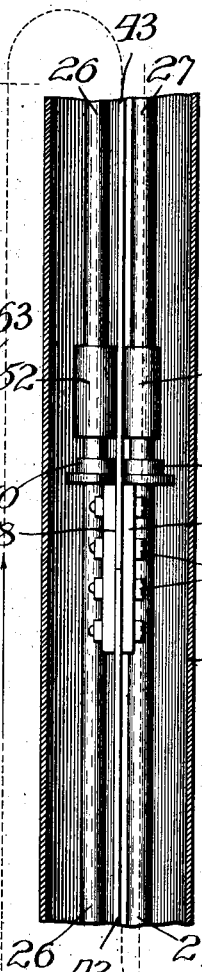
Figure 3:
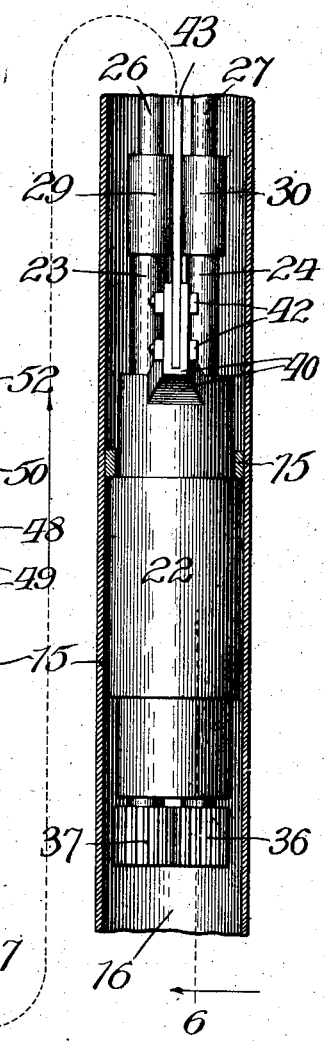

Figure 1 is an upright central sectional detail view of the top of a well-pipe having my invention applied thereto, taken on line 1 of Fig. 4. Fig. 2 is an extension of the bottom of Fig. 1; and Fig. 3 is an extension of the bottom of Fig. 2, showing the pump in the bottom of the well, Figs. 2 and 3 being respectively taken through the center of Figs. 5 and 6. Fig. 4 is a sectional side view through the center of Fig. 1, while Figs. 5 and 6 are central side views through the centers, respectively, of Figs. 2 and 3. Fig. 7 is a plan view of the top of the device taken on the line 7 of Fig. 1. Fig. 8 is a central sectional detail view through the pump proper, taken on line 8 of Fig. 11. Fig. 9 is a sectional plan view on a line 9 of Fig. 4. Fig. 10 is a sectional detail plan view through line 10 of Fig. 8. Fig. 11 is a sectional plan view through line 11 of Fig. 8.

In my prior patent, No. 744,352, above referred to, I show a pump adapted to be constructed in an ordinary water-pipe and inserted in the well. To remove such a pump from the well, it is necessary to remove the entire pipe containing the pump from the point at which it is located up to the surface of the ground. This is often very inconvenient, particularly in the case of driven wells, where the pump-pipe is, in fact, the lining of the well itself.

The principal object of my invention in this application is to improve the device of that patent by providing a means for hanging the pump, preferably the pump of said patent, inside of the pump-pipe proper in such a way that it can be removed for repairs and cleaning.

It also consists in novel means for applying power to the pump while thus loosely suspended in the well and in means for supporting the pump driving-rods intermediate between the pump and the top of the ground.

Again, referring to the drawings, the numeral 15 indicates a well-pipe inserted in the ground either in direct contact with the earth or in a larger opening in the earth, as desired. The bottom 16 of this pipe is immersed in the water to be pumped, and at the top of the pipe is an opening 17, through which the water pumped may be forced either into city water-mains or other receptacle, as described. This opening 17 is, however, in a larger T or pipe 18, secured to the well-pipe proper 15 by bolts 19 or other suitable means. This pipe 18 being larger than the pipe 15, leaves a ledge or shelf 20 around the end of the top of the pipe 15 inside the pipe 18.

I provide a pump-case proper, 22, having mounted in it two short shafts 23 and 24, adapted to be coupled or detachably secured to long shafts 26 and 27, extending up through the main pipe 15 by means of the couplers or connecting members 29 and 30. On these short shafts 23 and 24 and inside of the pump-case proper, 22, are impellers 31 and 32, adapted, as the shafts 23 and 24 are rotated, to draw water through the opening 34 into the pump proper and force it out through the opening 35 up into the pipe 15. This pump proper, with the impellers inside of it, is covered by my prior patent, No. 744,352, heretofore referred to, and I do not therefore claim it here as a part of my invention. On the lower ends of the short shafts 23 and 24 are pinions 36 and 37, meshing with each other in such a way as to cause the shafts and impellers to rotate together properly for this pumping action, as described in my prior patent above referred to.

In order to suspend the pump 22 in the well-pipe 15, I cast or otherwise secure upon the upper end of the pump-casing 22 lugs 40. To these lugs 40 I secure by bolts 42 a bar or rod or rods 43, extending upward through the center of the well-pipe 15 between the shafts 26 and 27, and at the upper end of this flat rod or rods 43 I secure, by bolts 45 or other suitable means, cross-bars 46, adapted to just fit inside of the pipe or T-joint 18 and rest upon the ledge or shelf 20 on the end of pipe 15, with the result that the pump 22 is suspended by said rod or rods 43 from this shelf or ledge 20. In order to provide bearing-supports for the shafts 26 and 27, heretofore referred to, intermediate of their lengths, I splice the rod or rods 43 with splice-plates 48, secured in position by the bolts 49 or other suitable means. On the tops of these vertical splice-plates I place bearings 50, inclosing and forming journal-bearings for the shafts 26 and 27, as shown. These bearings may be made integral with the splice-plates 48 or they may be made detachable and secured thereto by bolts or screws or other suitable means. If the well in which the pump is used is not a deep one, only one or two of these bearings 50 need be inserted for the purpose of supporting the shafts 26 and 27; but if the well goes down several hundred or one thousand feet similar bearings should be inserted at frequent intervals. For the same reasons the shafts 26 and 27 may be made in one piece or spliced at intervals by the splices 52, like splices 29 and 30, as the depth of the well may require. The upper ends of these shafts 26 and 27 are secured to short shafts 54 and 55, geared together by the pinions 56, corresponding to pinions 36 and 37, heretofore described. There are the same number of teeth on each of these four pinions, so that both shafts rotate at the same speed and the impellers can pump.

The short shafts 54 and 55 are journaled in the saddle 58, secured as shown, by bolts 59 to the castings 60. The lower portions of said shafts are also journaled in the plate 61, which closes the upper end of T or pipe 18, being secured thereto by the bolts or screws 62. The castings 60 are, as shown, secured to the upper end of the pipe 18 by bolts or screws 63. On the upper end of one of the vertical shafts is a bevel-pinion 65, meshing with a larger gear 66, mounted on shaft 67, journaled in upright support 68. On this shaft 67 is a pulley 69, to which power may be applied and transmitted through the mechanism heretofore described to the pump-impellers 31 and 32.

Above the pump proper, heretofore described, I provide a framework 71 72, as shown, provided with a hook 73, by which the pumping parts may be temporarily suspended while being assembled, as heretofore described. In order to prevent water in the main pipe 15 above the pump 22 from flowing around the outside of the pump and between it and the wall of the pipe 15 back to the bottom of the well, I provide a packing-ring 75, adapted to rest on the top of the pump inside the pipe 15, as shown.

In the operation of installing the device I slowly lower the pump 22, with the ring 75 upon it, into the well-pipe 15 and splice on additional lengths of driving-shafts 26 and 27 and suspension-rods 43 by the means described until the pump 22 is at the bottom of the well. I then connect the gearing mechanism shown in Figs. 1 and 4, and the pump is ready for use. As the shafts 26 and 27 are rotated in opposite directions, their reactions counteract each other and pumping is effected, while the pump 22 is loose in the well, as described, whereas were only one shaft used, as in the pump of my said prior patent, the pump would have to be fastened in the pipe 15 to prevent its twisting around in the pipe, and thus twisting and injuring the driving-shaft. When it is desired to remove the pump 22 from the well, I simply reverse the order of the operations for putting it in place. In the pumping operation I rotate the pulley 69, thereby rotating the shafts 26 and 27 and the impellers 31 and 32. This in the manner described in my prior patent causes water to be drawn in through the opening 34, Fig. 8, and forced out through opening 35 of the pump proper up into the pipe 15. The continual forcing of water into pipe 15 causes it to finally rise to a sufficient height to flow out of the opening 17, heretofore described.

I do not wish to be understood as limiting myself to exact details of construction, which may be varied within reasonable limits without departing from my invention.

Having thus described my invention, what I claim as new, and desire to secure by Letters Patent, is—

1. In mechanism of the class described, the combination of a well pipe or casing, a removable pump proper adapted to be slipped up and down inside of said pipe, a removable suspension-rod in said pipe having one end secured at or near the top of the well and the other end secured to the pump and means other than said suspension-rod for operating the pump within the well.

2. In mechanism of the class described the combination of a well pipe or casing, a removable pump proper adapted to be slipped up and down inside of said pipe, a removable suspension-rod in said pipe having one end secured at or near the top of the well and the other end secured to the pump; a removable shaft inside said pipe adapted when rotated to operate said pump within the well and a bearing on said suspension-rod intermediate of its length supporting said shaft within the well-pipe.

3. In mechanism of the class described, the combination of a well pipe or casing, a pump proper adapted to be slipped up and down inside of said pipe, a suspension-rod in said pipe having one end secured at or near the top of the well and the other end secured to the pump; a detachable packing-ring adapted to prevent pumped liquid passing back between the pump and the well-pipe, and means for operating the pump within the well.

4. In mechanism of the class described, the combination of a well pipe or casing, a pump proper adapted to be slipped up and down inside of said pipe, a suspension-rod in said pipe having one end secured to a detachable bar across the top of the well-pipe and the other end secured to the pump and means for operating the pump within the well.

5. In mechanism of the class described, the combination of a well pipe or casing, a pump proper adapted to be slipped up and down inside of said pipe, a spliced suspension-rod in said pipe having one end secured at or near the top of the well and the other end secured to the pump in the well, a shaft inside said pipe adapted when rotated to operate the pump within the well and a bearing for the shaft on the splice mechanism of the suspension-rod whereby the shaft is supported between its length.

6. In mechanism of the class described, the combination of a well pipe or casing, a pump proper adapted to be slipped up and down inside of said pipe, a suspension-rod in said pipe having one end secured at or near the top of the well and the other end secured to the pump; two shafts inside said pipe connected to the pump within the well and means for rotating said shafts in opposite directions to operate the pump within the well.

7. In mechanism of the class described, the combination of a well pipe or casing, a pump proper adapted to be slipped up and down inside of said pipe, a suspension-rod in said pipe having one end secured at or near the top of the well and the other end secured to the pump; two shafts inside said pipe connected to the pump within the well; means for rotating said shafts in opposite directions to operate the pump within the well, and bearings on said suspension-rod intermediate of its length supporting said shafts within the well-pipe.

8. In mechanism of the class described, the combination of a well pipe or casing, a pump proper adapted to be slipped up and down inside said pipe, operative parts inside said pump proper adapted to be moved in opposite directions to pump, means for detachably suspending the pump within the well and means for operating said operative parts of the pump while in the pipe in such a way that during the pumping operation their reactions on each other are substantially equal.

9. In mechanism of the class described the combination of a well pipe or casing, a pump proper adapted to be slipped up and down inside the pipe, removable means for suspending the pump inside the pipe and means for operating the pump while in the pipe.

10. In mechanism of the class described, the combination of a well pipe or casing, a pump proper adapted to be slipped up or down inside of said pipe, a suspension-rod in said pipe having one end secured at or near the top of the well and the other end secured to the pump and means for operating the pump within the well.

11. In mechanism of the class described the combination of a well pipe or casing, a pump proper adapted to be slipped up and down inside of said pipe, a suspension-rod in said pipe having one end secured at or near the top of the well and the other end secured to the pump; a shaft inside said pipe adapted when rotated to operate said pump within the well and a bearing on said suspension-rod intermediate of its length supporting said shaft within the well-pipe.

In witness whereof I have hereunto subscribed my name in the presence of two witnesses.

THOS. T. JOHNSTON.

Witnesses:
CAROLYN RAFTERY,
DWIGHT B. CHEEVER.